United States Patent
Sone

(10) Patent No.: US 7,414,683 B2
(45) Date of Patent: Aug. 19, 2008

(54) TRANSFLECTIVE FILM AND LIQUID CRYSTAL DISPLAY DEVICE USING THE SAME

(75) Inventor: Takehiko Sone, Fukushima-ken (JP)

(73) Assignee: Alps Electric Co., Ltd, Tokyo (JP)

( * ) Notice: Subject to any disclaimer, the term of this patent is extended or adjusted under 35 U.S.C. 154(b) by 131 days.

(21) Appl. No.: 10/968,646

(22) Filed: Oct. 19, 2004

(65) Prior Publication Data
US 2005/0128387 A1 Jun. 16, 2005

(30) Foreign Application Priority Data

Oct. 21, 2003 (JP) ............................. 2003-360652
Oct. 21, 2003 (JP) ............................. 2003-360653

(51) Int. Cl.
*G02F 1/1335* (2006.01)
(52) U.S. Cl. .................................... 349/114; 349/106
(58) Field of Classification Search ......... 349/113–114, 349/106–108
See application file for complete search history.

(56) References Cited

U.S. PATENT DOCUMENTS 6,825,902 B2* 11/2004 Kaneko ...................... 349/114
2002/0054260 A1 5/2002 Maeda et al. ............... 349/117

* cited by examiner

*Primary Examiner*—Dung T. Nguyen
(74) *Attorney, Agent, or Firm*—Brinks Hofer Gilson & Lione

(57) ABSTRACT

A transflective film is provided on an inner or outer side of a liquid crystal display panel having opposing electrodes provided between a pair of substrates with a liquid crystal layer interposed therebetween and a plurality of pixels defined by the opposing electrodes. A plurality of minute concave portions or minute convex portions are formed on the surface of the transflective film. A plurality of apertures for transmitting the light from an illumination device on a back surface of the liquid crystal display panel to the dot region corresponding to each dot included in each of the pixels is formed. The plurality of apertures are arranged in the dot region and the interval between the adjacent apertures is smaller than the resolution.

17 Claims, 14 Drawing Sheets

TRANSFLECTIVE FILM AND LIQUID CRYSTAL DISPLAY DEVICE USING THE SAME

This application claims the benefit of priority to Japanese Patent Application Nos. 2003-360652 and 2003-360653 both filed on Oct. 21, 2003, herein incorporated by reference.

BACKGROUND OF THE INVENTION

1. Field of the Invention

The present invention relates to a transflective liquid crystal display device for portable electronic devices.

2. Description of the Related Art

In portable electronic devices such as a mobile phone or a portable game device, since duration of battery life time significantly affects its usability, a reflective liquid crystal display device having low power consumption has been employed as a display device. The reflective liquid crystal display device typically comprises a reflector for totally reflecting the external light incident from the front surface thereof or a reflector for reflecting the external light incident from the front surface and for transmitting the backlight from the back surface.

Among these reflectors, the reflector for reflecting the external light incident from the front surface and for transmitting the backlight from the back surface is commonly referred to as a transflective reflector. For example, as the transflective reflector, transflective film made by forming apertures in a certain region of a metal thin film is used (for example, see Japanese Unexamined Patent Application Publication No. 2001-222009). The region in which the apertures are formed is a dot region corresponding to three dots colored Red, Green, and Blue included in a plurality of pixels formed in the liquid crystal display panel.

In a conventional transflective liquid crystal display device in which a transflective reflector is formed on the liquid crystal display panel and an illumination device such as the backlight unit is provided on the back surface of the liquid crystal display panel, the light from the illumination device is transmitted through the aperture in the transflective film toward the surface of the liquid crystal display panel when the illumination device is turned on (in the transmission mode) and the external light is reflected toward the surface of the liquid crystal display panel at the portion (reflection region) other than the aperture in the transflective reflector when the illumination device is turned off (in the reflection mode). Thereby, the liquid crystal display panel can be brightly illuminated by any light source of the illumination device and by the external light.

FIG. 19 is a plan view showing the arrangement of an aperture 132 formed in the dot region 113a of the transflective film corresponding to each of three dots colored Red, Green, and Blue included in each pixel of the liquid crystal display panel equipped in the conventional transflective liquid crystal display device. The aperture ratio of the dot region (the area $S_a$ of the aperture/the area $S_0$ of the dot region) is in the range of 20 to 50%. In addition, in FIG. 19, the reference letters BM indicates a lattice-shaped black matrix formed on the transflective film and dots (not shown) are formed in the inner side of the black matrix BM. The width $W_{BM}$ of the black matrix BM is in the range of about 5 to 25 μm taking into consideration that the lamination leads to the alignment of about a few μm.

For example, the longitudinal length $L_D$ of one dot region 113a is 285 μm, and the width $W_D$ thereof is 95 μm. At this time, the longitudinal length $L_H$ of the aperture 132 is 143 μm, and the width $W_H$ thereof is 50 μm. Also, the interval $P_H$ of the adjacent apertures 132, 132 of two adjacent dot regions 113a, 113a in a plurality of dot regions arranged in the longitudinal direction is 142 μm.

However, in case that the above-mentioned conventional transflective liquid crystal display device is in the transmission mode when the display mode is in a normally white mode, a band-shaped dark portion G (the portion shown by a hatched line in FIG. 19) that extends in a horizontal direction in the display shown by the range A is generated when turning on six dots (three in the horizontal direction×two in the vertical direction) of the range A surrounded by a dotted line in FIG. 19, which consequently deteriorates the display quality. Also, in case that the above-mentioned conventional transflective liquid crystal display device is in the reflection mode when the display mode is in a normally black mode, if the dots of the lower side (the range D surrounded by a dotted line in FIG. 19) are turned on when turning on three dots (horizontal direction 3×vertical direction 2) in the range C surrounded by a dotted line in FIG. 19, the reflection portion between the range C and the range D appears on the reflection display region, and the display is deviated by a half pixel, which also consequently deteriorates the display quality. Further, even in case that the display mode is in a normally white mode, the band-shaped dark portion is generated in the display or the display is deviated by the half-pixel.

SUMMARY OF THE INVENTION

An object of the present invention is to provide a transflective liquid crystal display device in which the band-shaped dark portion is not be generated in the display and the half-dot deviation of the display can be prevented.

In order to solve the above-mentioned problems, according to the present invention, a transflective film is provided on an inner or outer side of a liquid crystal display panel having opposing electrodes provided between a pair of substrates with a liquid crystal layer interposed therebetween and a plurality of pixels defined by the opposing electrodes, wherein the transflective film comprises a plurality of minute concave portions or minute convex portions formed on a surface thereof, and a plurality of apertures for transmitting the light from an illumination device that illuminates the liquid crystal display panel from a back surface thereof in the dot region corresponding to each dot included in each of the pixels, and wherein the plurality of apertures are arranged in the dot region and the interval between the adjacent apertures is smaller than the resolution.

Also, it is preferable that the interval between the adjacent apertures of two adjacent dot regions in the plurality of dot regions arranged in a longitudinal direction is smaller than the resolution.

The size that is smaller than the resolution in the present invention refers to a non-visible size, that is, the size which cannot be viewed.

It is preferable that the aperture ratio (the area of the aperture/the area of the dot region) of the dot region in the transflective film according to the present invention is in the range of 20 to 50%.

It is preferable that the interval between the adjacent apertures in a plurality of apertures arranged in the dot region is less than or equal to 40 μm, and the interval in the two adjacent apertures between the adjacent dot regions in the plurality of dot regions arranged in the longitudinal direction is less than or equal to 40 μm.

Also, it is preferable that the interval between the adjacent apertures in the plurality of apertures arranged in the dot region is approximately equal to the interval between the adjacent apertures in the two adjacent dot regions in the plurality of dot regions arranged in the longitudinal direction.

Moreover, each pixel of the liquid crystal display panel may comprise three dots colored Red, Green and Blue.

In order to accomplish the above-mentioned object, a transflective liquid crystal display device comprises a liquid crystal display panel which has opposing electrodes provided between a pair of substrates with a liquid crystal layer interposed therebetween and a plurality of pixels defined by the opposing electrodes, and an illumination device for illuminating the liquid crystal display panel from a back surface side thereof, and the transflective film having the above structure is formed on the inner or outer side of the liquid crystal display panel is provided.

In the transflective liquid crystal display device according to the present invention, the transflective film in which an interval between adjacent apertures of two dot regions arranged in the longitudinal direction (vertical direction) is less than or equal to the resolution. Accordingly, although a plurality of dots are turned on in the vertical direction (longitudinal direction) and the horizontal direction (width direction) in the transmission mode when the display mode is in a normally black mode, the interval between the adjacent apertures in the longitudinal direction can not be viewed, thereby the band-shaped dark portion extending in the horizontal direction is not generated during the display. Also, although the lower side of a plurality of dots are turned on when the plurality of dots (the upper side of the plurality of dots) are turned on in the horizontal direction in the reflection mode when the display mode is in the normally black mode, the half-dot deviation is not generated because the aperture interval between the upper and lower pixels is narrower than the clearly viewed interval even when two vertical rows are displayed (as the aperture interval is less than the visible distance).

Also, even in case that the display mode is in the normally white mode, the band-shaped dark portion is not generated during the display and the half-dot deviation of the display can be prevented.

In addition, in the transflective film according to the present invention, since a plurality of apertures are arranged in the dot region, the non-aperture exists between the apertures in the dot region, the width of the aperture can become wide while the aperture ratio of the dot region is in the range of 20 to 0.50%, and thus a dark portion extending in the horizontal direction in the display can be prevented from being generated (also, according to test results, the band-shaped dark portion extending in the vertical direction is viewed more than the band-shaped dark portion extending in the horizontal direction and does not catch the viewer's eye).

Also, since the non-aperture (between the adjacent apertures) is smaller than the resolution, the dark portion between the adjacent apertures in the vertical direction in the dot region is not generated.

Accordingly, since the transflective liquid crystal display device of the present invention comprises the transflective film having the above-mentioned structure, the band-shaped dark portion is not generated during the display and the half-dot deviation of the display can be prevented. Therefore, a transflective liquid crystal display device having an excellent display quality can be realized.

Also, it is preferable that the transflective film further comprises apertures for communicating with a portion in which a black region is formed.

The black region of the present invention refers to the so-called black region that does not contribute to the transmission. That is, the region that corresponds to the portion in which this black matrix is formed, such as in the case of the liquid crystal display panel in which the black matrix is formed.

The transflective film of the present embodiment is characterized in that a plurality of apertures are formed in the dot region, the interval between the adjacent apertures is smaller than the resolution, and the apertures arranged at the both ends of the longitudinal direction (vertical direction) and/or at the both ends of the width direction (horizontal direction) of the dot region of a plurality of apertures formed in the dot region communicated with the portion in which the black region is formed.

The size that is smaller than the resolution in the present invention refers to the non-visible size, that is, the size which can not be viewed.

In the transflective film according to the present invention, by forming the aperture communicating with the so-called black region that does not contribute to the transmission, the interval between the apertures can be reduced to the width of the black region. The aperture integral with the adjacent pixel can be formed by the communication, and thus the aperture can be formed without taking into consideration the precision of fitting of the aperture and the black region (generally, 2 to 5 μm).

It is preferable that the aperture ratio (the area of the aperture/the area of the dot region) of the dot region in the transflective film according to the present invention is in the range of 20 to 50%.

Also, in the transflective film, it is preferable that the interval between the adjacent apertures in a plurality of apertures arranged in the dot region is less than or equal to 40 μm.

Moreover, it is preferable that each pixel of the liquid crystal display panel comprise three dots colored Red, Green and Blue.

In order to accomplish the above-mentioned object, according to the present invention, a transflective liquid crystal display device comprises a liquid crystal display panel which has opposing electrodes provided between a pair of substrates with a liquid crystal layer interposed therebetween and a plurality of pixels defined by the opposing electrodes, and an illumination device for illuminating the liquid crystal display panel from the back surface side, the transflective film having the above structure is formed on the inner or outer side of the liquid crystal display panel is provided.

The transflective liquid crystal display device according to the present invention comprises the transflective film in which a plurality of apertures are arranged in dot regions and the interval between the apertures is less than or equal to the resolution. Further, the transflective film has apertures which communicate with a black region that does not contribute to transmission. Accordingly, although a plurality of dots are turned on in the vertical direction (longitudinal direction) and the horizontal direction (width direction) in the transmission mode when the display mode is in a normally black mode, the interval between the adjacent apertures in the longitudinal direction is not viewed, thereby the band-shaped dark portion extending in the horizontal direction is not generated during the display. Also, although the lower side of a plurality of dots are turned on when turning on the plurality of dots (the upper side of the plurality of dots) in the horizontal direction in the reflection mode when the display mode is in the normally black mode, the half-dot deviation is not generated, because the aperture interval between the upper and lower pixels is narrower than the clearly viewed interval even when two vertical rows are displayed (as the aperture interval is less than the visible distance).

Also, even in case that the display mode is in the normally white mode, the band-shaped dark portion is not generated during the display and the half-dot deviation of the display can be prevented. In addition, in the transflective film according to the present invention, since a plurality of apertures are arranged in the dot region, the non-aperture exists between the apertures in the dot region, the width of the aperture can become wide while the aperture ratio of the dot region is in the range of 20 to 50%, and thus a dark portion extending in the horizontal direction in the display can be prevented from being generated. (Also, according to test results, a band-shaped dark portion extending in the vertical direction is viewed more than a band-shaped dark portion extending in the horizontal direction and does not catch the viewer's eye).

Also, since the non-aperture (between the adjacent apertures) is smaller than the resolution, the dark portion between the adjacent apertures in the vertical direction in the dot region is not generated.

In conclusion, since the transflective liquid crystal display device of the present invention comprises the transflective film having the above-mentioned structure, the band-shaped dark portion is not generated during the display and the half-dot deviation of the display can be prevented. Therefore, the transflective liquid crystal display device has an excellent display quality.

Further, each pixel of the liquid crystal display panel comprises three dots colored Red, Green and Blue, a black matrix is formed in the periphery of each dot, and the width of the black matrix may be in the range of 10 µm to 25 µm. In the transflective film included in the liquid crystal display device, a plurality of apertures are arranged in the dot region and the aperture for communicating with the portion in which the black region corresponding to the black matrix is formed is provided therein. Therefore, a color filter layer comprising three dots and the black matrix, the transflective film, and the conductive film are laminated and the positioning process is easily performed when patterning the conductive film. Accordingly, although the manufacturing dimension precision and the deviation of the manufacturing location precision of each layer laminated on the aperture are not taken into consideration, the interval between the apertures can be narrowed to the width of the black matrix because it can be manufactured integral with the aperture of the adjacent pixel.

Since the transflective liquid crystal display device of the present invention comprises the transflective film having the above-mentioned structure, the band-shaped dark portion is not generated during the display and the half-dot deviation of the display can be prevented. Therefore, the transflective liquid crystal display device has an excellent display quality and can be seen in any one of the transmission mode and the reflection mode.

DESCRIPTION OF THE PREFERRED EMBODIMENT

Hereinafter, embodiments of the present invention will now be described with reference to the drawings.

Figure 1:
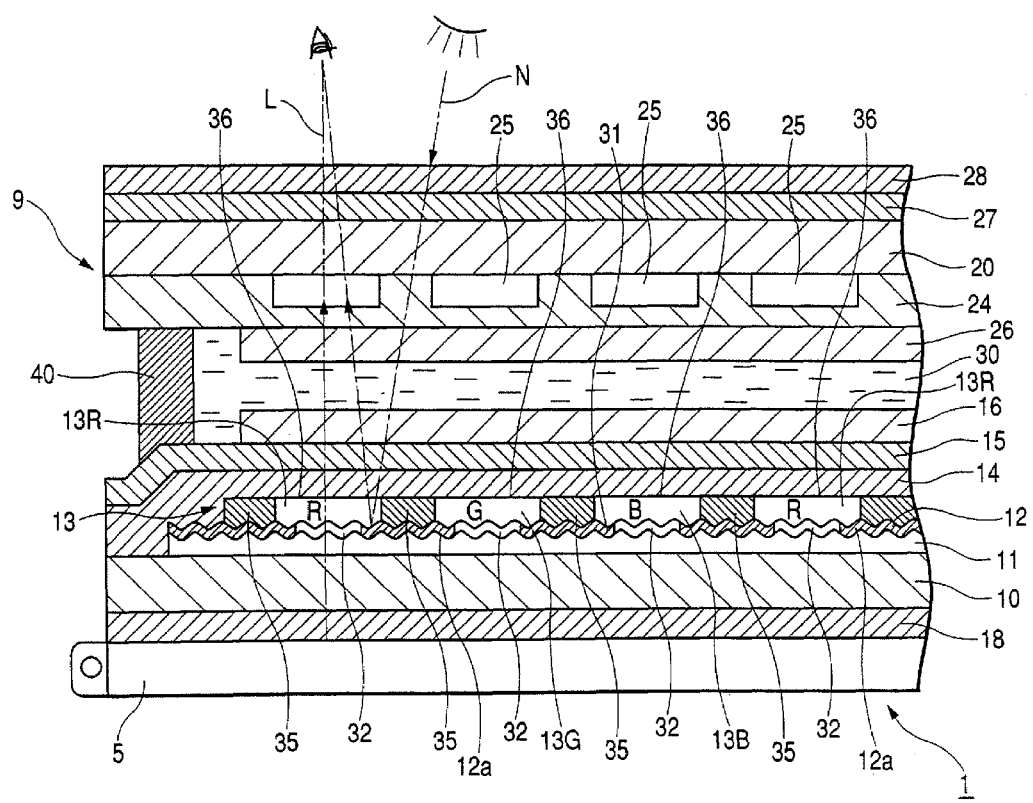
FIG. 1 is an enlarged cross sectional view showing an example of a transflective liquid crystal display device having a transflective film according to an embodiment of the present invention.

FIG. 1 schematically shows an example of a transflective liquid crystal display device having a transflective film according to the present invention.

The transflective liquid crystal display device 1 comprises a liquid crystal display panel 9 in which a transparent a light transmitting first substrate 10 and a second substrate 20 composed of transparent glass and facing each other with a liquid crystal layer 30 interposed therebetween are adhered to each other by a seal material 40 provided on the circumference of the substrates 10, 20 (a pair of the substrates), and a backlight unit 5 serving as an illumination device.

On a surface of the first substrate 10 which faces the liquid crystal layer 30, an organic film 11 for forming a concave portion (dimple) 31 in the below-mentioned transflective film 12, the transflective film 12 for reflecting light incident to the liquid crystal display device 1 and for transmitting the light from the backlight unit 5, a color filter layer 13 for performing the color display, an overcoat film 14 for covering the organic film 11 and the transflective film 12 to protect and for planarizing irregularities due to the organic film 11 or the color filter layer 13, a plurality of first electrodes 15 for driving the liquid crystal, and a first alignment film 16 for controlling the alignment of the liquid crystal molecules composing the liquid crystal layer 30 are laminated in this order. Also, on a surface of the second substrate 20 which faces the liquid crystal layer 30, a plurality of second electrodes 25, an overcoat film 24, and a second alignment film 26 are laminated in this order.

Figure 2:
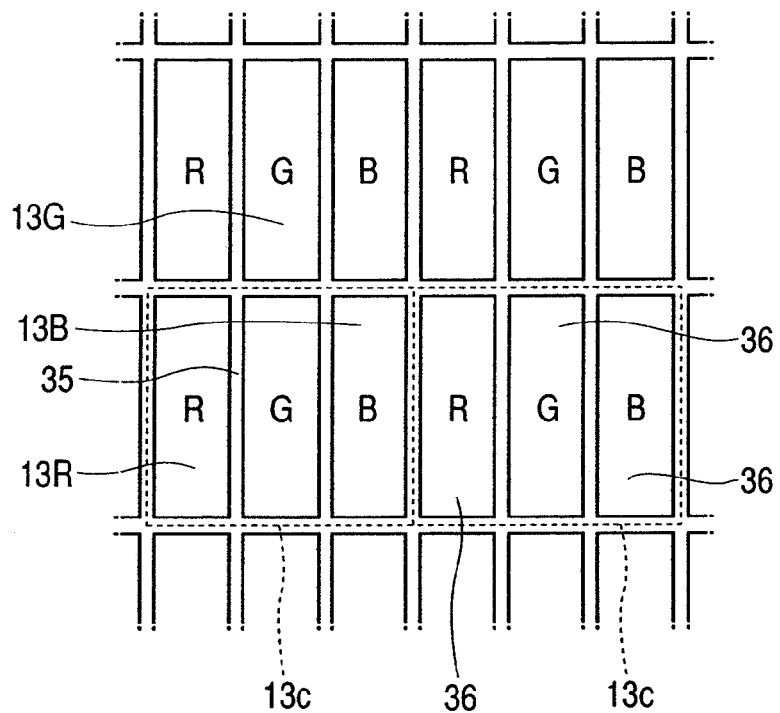
FIG. 2 is an enlarged plan view showing pixel groups of the liquid crystal display panel equipped in the transflective liquid crystal display device shown in FIG. 1.

The first electrode 15 and the second electrode 25 have a rectangular shape and are arranged in a stripe shape in a plan view. The first electrode 15 and the second electrode 25 are composed of transparent electrode material. The first electrode 15 extends in the horizontal direction in drawing. The extending direction of the first electrodes 15 is perpendicular to that of the second electrodes 25 in plan view. Accordingly, one dot of the liquid crystal display panel 9 is formed at an intersection of the first electrode 15 and the second electrode 25 and, one color filter of three color filters is arranged so as to correspond to each dot. Also, three dots colored Red (R), Green (G) and Blue (B) compose one pixel 13c of the liquid crystal display panel 9, as shown in FIG. 2. Also, in the liquid crystal display panel 9, a plurality of pixels 13c are arranged in the rectangular display region in a matrix, in the plan view.

The color filter layer 13 is formed such that color filters 13R, 13G, 13B corresponding to Red, Green and Blue are periodically arranged, and each color filter is formed below the intersection of the first electrode 15 and the second electrode 25. A set of the color filters 13R, 13G, 13B is provided for each pixel 13c. Further, by driving the electrode corresponding to each of the color filters 13R, 13G, 13B, the display color of the pixel 13c is controlled. Moreover, a black matrix (light shielding wall) 35 is generally formed between the color filters, in order to prevent the color of light from being mixed between adjacent color filters. Each region divided by the black matrix 35 forms the dot 36.

In addition, although the color filters (coloring layers) are arranged in a stripe shape in FIG. 2, the arrangement of the color filters is not limited to this and mosaic arrangement may be used.

On a surface opposite to the surface of the first substrate 10 which faces the liquid crystal layer 30 (the outer side of the first substrate 10), a polarization film 18 is provided. On a surface opposite to the surface of the second substrate 20 which faces the liquid crystal layer 30 (the outer side of the second substrate 20), a retardation plate 27 and a second polarization plate 28 are laminated in this order. Also, on the outer side of the first polarization plate 18, a backlight unit 5 is provided as the illumination device for performing the transmission display in the liquid crystal display device 1.

The organic film 11 is formed in order to provide the concave portion 31 in the transflective film 12 formed thereon to efficiently scatter the reflected light. By forming the concave portion 31 in the transflective film 12, the external light incident to the liquid crystal display device 1 can be efficiently reflected, thereby results in the bright display when performing the illumination is due to the external light reflection.

For example, the transflective film 12 is composed of, a metal thin film having high reflectance such as aluminum. In the transflective film 12, a plurality of apertures 32 are formed in the dot region 12a corresponding to each of three dots 36 colored R, G, B included in each pixel 13c of the liquid crystal display panel 9, as shown in FIGS. 1, 2, 8, and 11. These apertures 32 allow the light irradiated from the backlight unit (illumination device) 5 to transmit the transflective film 12 which is made of a metal thin film.

Figure 8:
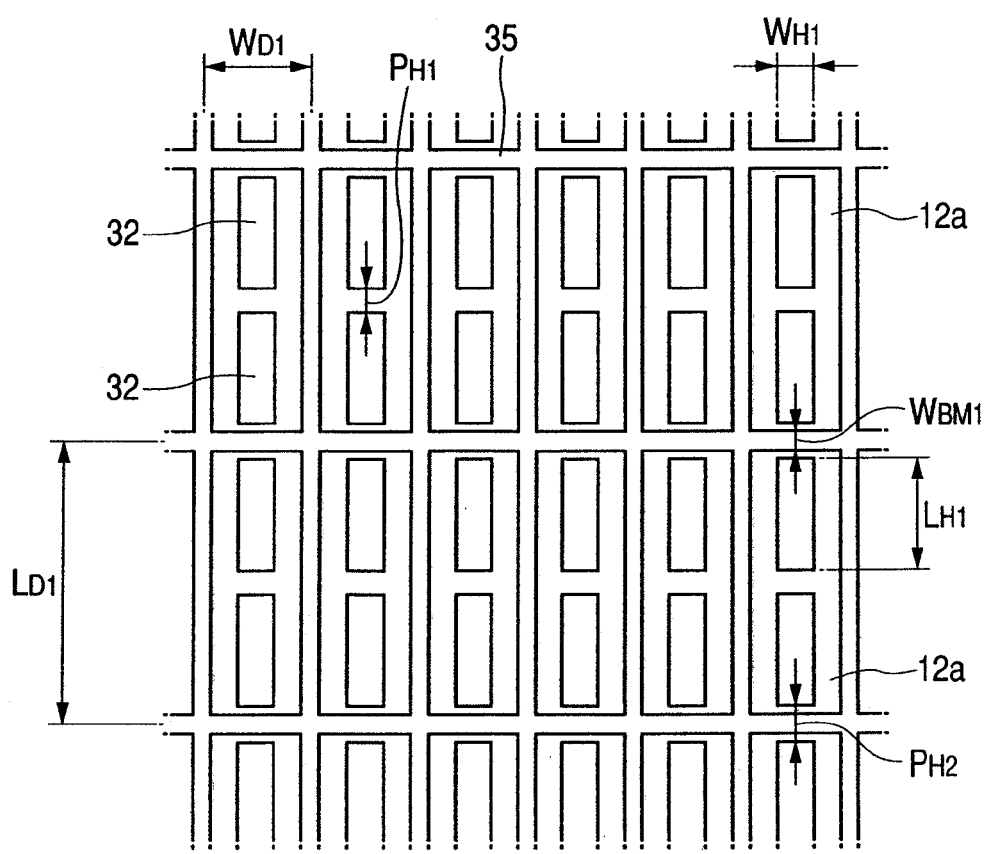
FIG. 8 is a plan view showing the arrangement of a plurality of apertures formed in the dot region corresponding to each of three dots included in each pixel of the liquid crystal display panel equipped in the transflective liquid crystal display device shown in FIG. 1.
Figure 11:
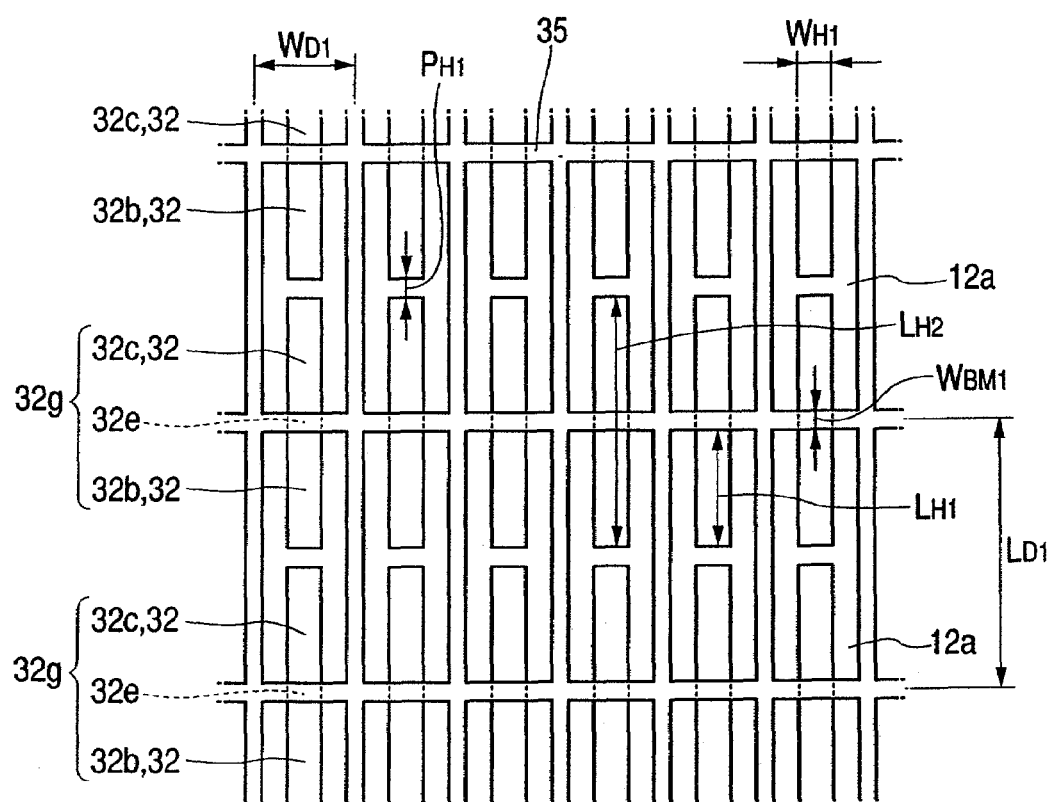
FIG. 11 is a plan view showing the arrangement of a plurality of apertures formed in the dot region corresponding to each of three dots included in each pixel of the liquid crystal display panel equipped in the transflective liquid crystal display device shown in FIG. 1.
Figure 12:
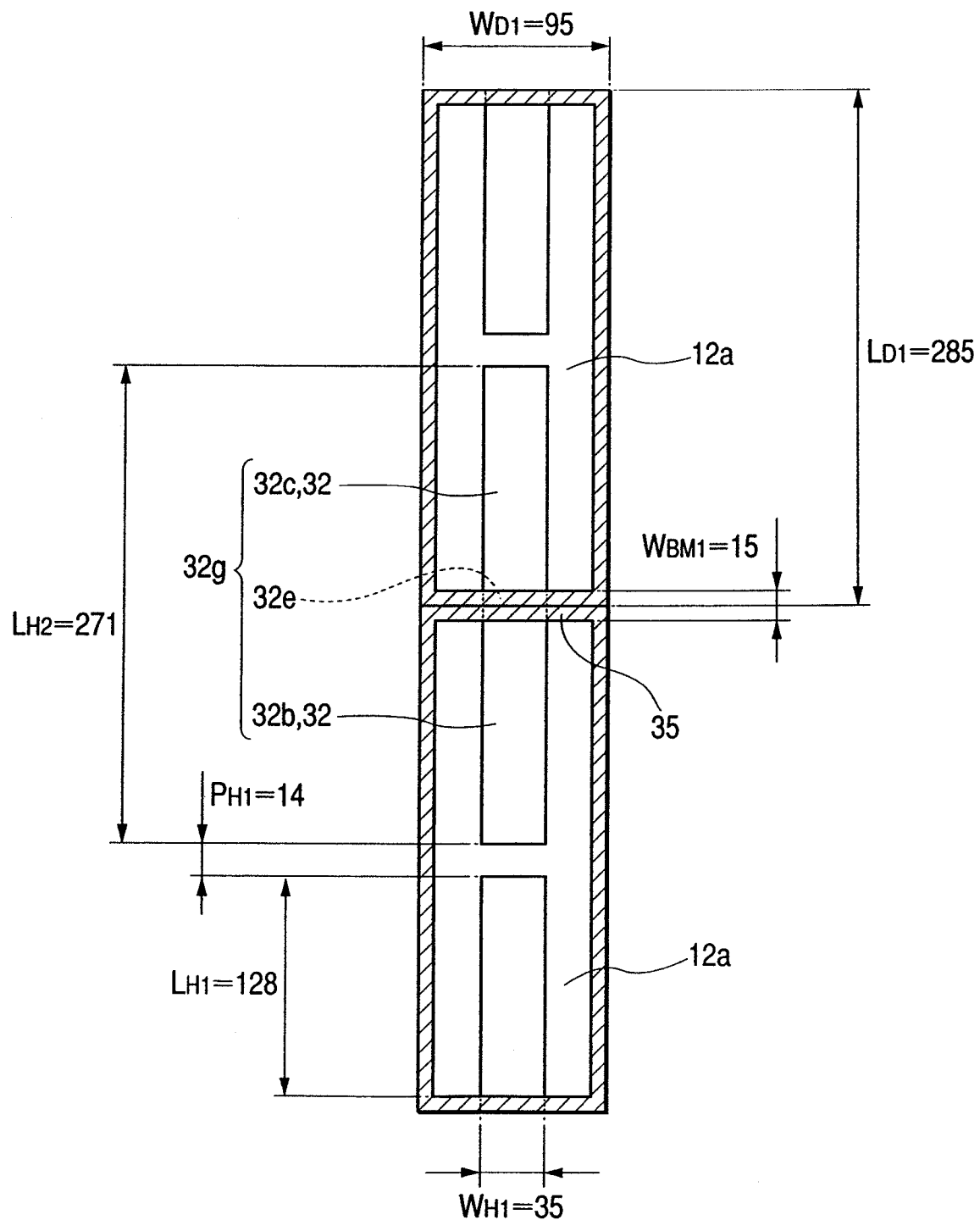
FIG. 12 is a plan view showing a concrete example of the dimensions of the dot region, the aperture and the black matrix of the liquid crystal display panel equipped in the transflective reflecting liquid crystal display device shown in FIG. 1.

In addition, FIGS. 8 and 11 are plan views showing the arrangement of a plurality of apertures 32 formed in the dot region 12a of the transflective film 12 corresponding to each of three dots 36 included in each pixel 13c of the liquid crystal display panel 9. In FIGS. 8 and 11, the numeral 35 is a lattice-shaped black matrix formed on the transflective film 12 and the dots (not shown) are formed in the inner side of the black matrix 35. The width $W_{BM1}$ of the black matrix 35 is in the range of 10 μm to 25 μm, preferably in the range of 10 μm to 15 μm.

Each dot region 12a is a portion of the transflective film 12 below the corresponding color filter and has a rectangular shape in the plan view. When viewing the transflective film 12 in the plan view, a plurality of rectangular dot regions 12a are arranged in the longitudinal direction (the vertical direction) and the width direction (the horizontal direction).

Figure 3:
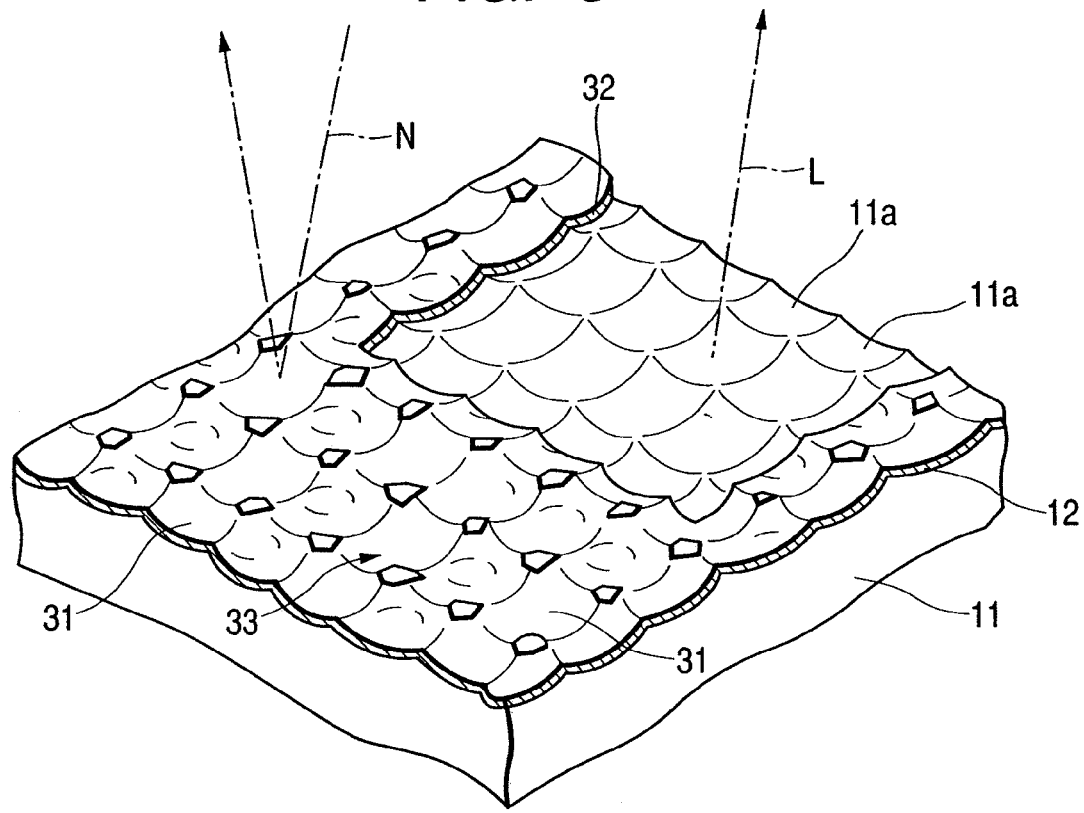
FIG. 3 is an enlarged perspective view showing a portion of an organic film and a transflective film shown in FIG. 1.

FIG. 3 is an enlarged perspective view showing a portion of the organic film 11 and the transflective film 12 formed thereon. As shown in drawing, on the surface of the organic film 11, a plurality of concave portions 11a of which the inner surface forms a portion of a spherical surface are continuously formed so as to be overlapped in the horizontal direction and the transflective film 12 is laminated on the surface thereof. By the concave portion 11a formed on the surface of the organic film 11, the concave portion 31 is formed in the transflective film 12. Also, each dot region of the transflective film 12 is formed with a plurality of rectangular apertures 32. These apertures 32 can be formed by using an etching method. By this structure, the transflective film 12 transmits the illumination light B from the backlight unit 5 through the aperture 32 and efficiently reflects the external light N in the reflection region 33 in which a plurality of concave portions 31 are formed in the vicinity of the aperture 32.

Figure 4:
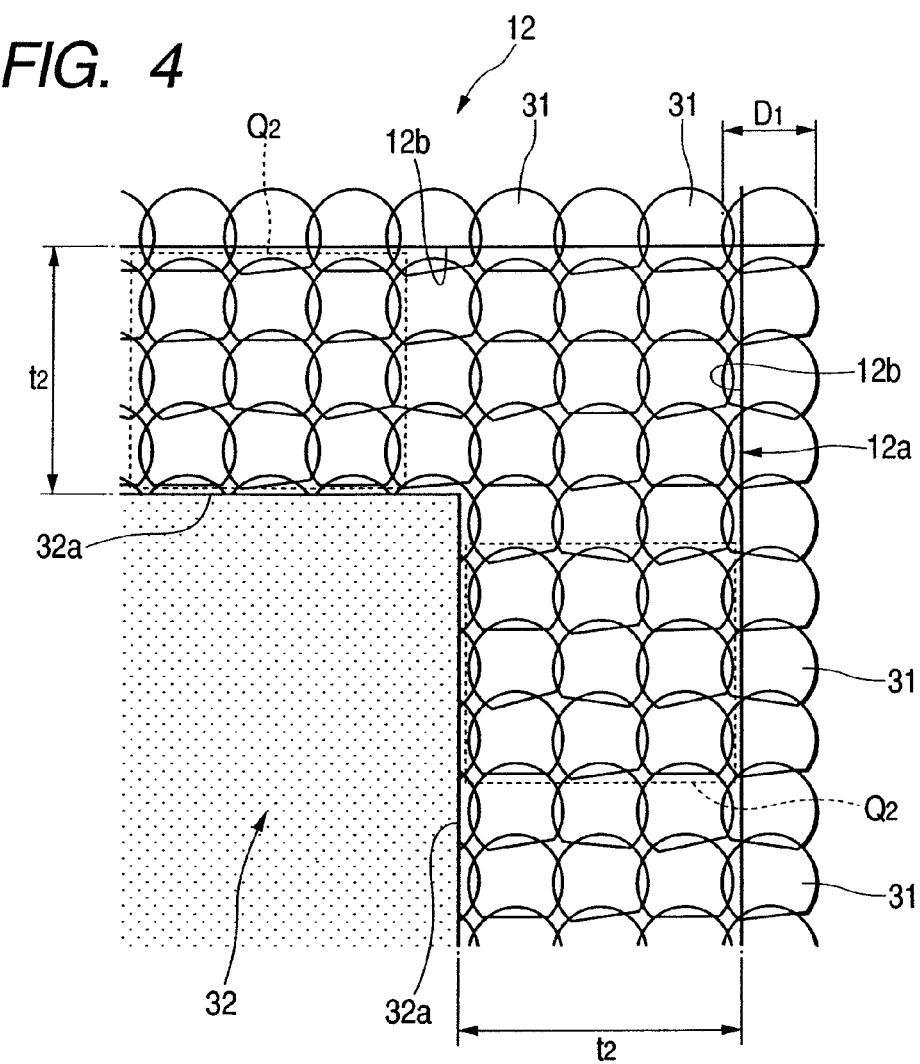
FIG. 4 is a partial enlarged view of one dot region when viewing the transflective film shown in FIG. 1 at the top surface thereof.

FIG. 4 is a partial enlarged view of one dot region when viewing the transflective film shown in FIG. 1 at the upper side thereof. In a plurality of apertures 32 formed in the transflective film 12, the aperture ratio is set in the range of 20 to 50% with respect to the surface area of one dot region 12a. The concave portion 31 has a predetermined diameter that at least two concave portions can be formed between the interval $t_2$ between the side 32a of the aperture 32 and the edge 12b of the dot region 12.

As shown by reference letter $Q_2$ in FIG. 4, in the transflective film 12, a desired reflection performance can be obtained by using a predetermined number (for example, at least two) of the concave portions 31 in perpendicular and horizontal directions as one unit. Accordingly, when the diameter $D_1$ of the concave portion 31 is set to the size of only one or less concave portion 31 being formed at the interval $t_2$ between the side 32a of the aperture 32 and the edge 12b of the dot region 12a, the ratio of the concave portion 31 that contributes to the reflection decrease and thus the reflectance deteriorates.

Accordingly, by miniaturizing the diameter $D_1$ of the concave portion 31 such that at least two concave portions 31 can be formed between the interval $t_2$ between the side 32a of the aperture 32 and the edge 12b of the dot region 12a, the reflectance increases at even the region interposed between the side 32a of the aperture 32 and the edge 12b of the dot region 12a. The reflectance of the transflective film 12 increases to the maximum.

Figure 5:
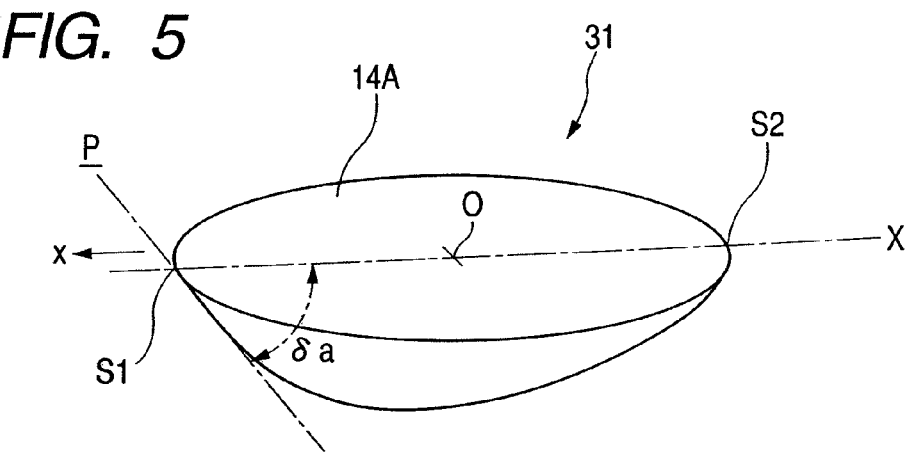
FIG. 5 is an enlarged perspective view schematically showing a concave portion formed in the transflective film.

FIG. 5 is a perspective view schematically showing the concave portion formed in the transflective film. It is preferable that the depths of the concave portions (dimple) 31 are randomly set in the range of 0.1 µm to 0.3 µm and the slope angle of the inner surface of the concave portion 31 is set in the range of −30 degree to +30 degree. Particularly, it is important that the slope angle of the inner surface of the concave portion 31 is set in the range of −30 degree to +30 degree and the pitches between the adjacent concave portions 31 are randomly arranged on the overall plane. The reason for this is because the interference color of the light output and the reflected light is colored if the pitch of the adjacent concave portions 31 is regular.

In addition, another reason is because the diffusion angle of the reflected light becomes too wide, the reflection strength is lowered and thus the bright display can be obtained if the range of the slope angle of the inner surface of the concave portion 31 is larger than the range of −30 degree to +30 degree. That is, the diffusion angle of the reflected light is at least 36 degrees in air, the peak of the reflection strength in the liquid crystal display device is reduced and the total reflection loss increases. Also, if the depth of the concave portion 31 is larger than 3 µm, the top of the convex portion is not entirely embedded by planarization film (the overcoat film 14) when planarizing the concave portion 31 in the post-process. This leads to the desired flatness not being obtained, thereby generates the display irregularity. Alternatively, the film thickness of the planarization film is larger than 3 µm, and thus the reliability of the panel can be adversely affected. (The shrinkage or the crack of the planarization film may be generated under the condition of a high temperature and a high humidity).

Figure 6:
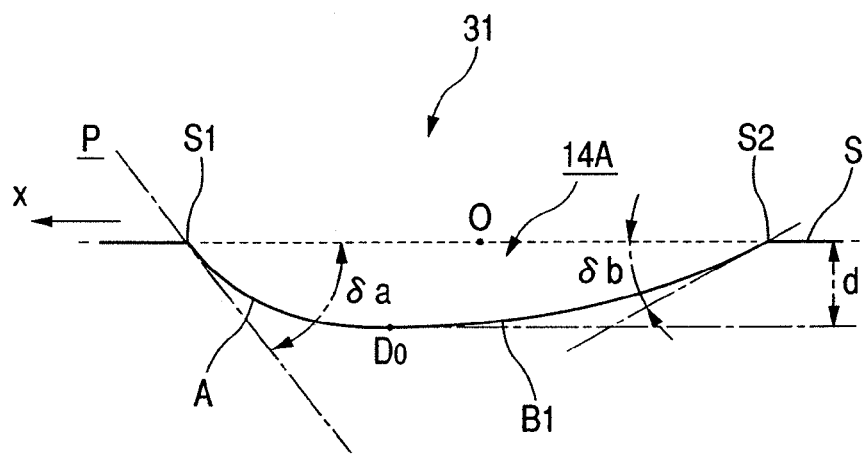
FIG. 6 is a cross sectional view showing an inner shape in the longitudinal section X of the concave portion shown in FIG. 5.

As shown in FIG. 6, the inner surface at a specific vertical section X of the concave portion 31 formed in the transflective film 12 has a first curve A1 reaching from a periphery S1 of the concave portion 31 to a deepest point $D_0$ and a second curve B1 reaching from the deepest point $D_0$ of the concave portion 31 to the other periphery S3 in succession to the first curve A1. The slope angles of these curves A1, B1 in the deepest point $D_0$ of the concave portion 31 with respect to the flat surface S become zero such that the curves are connected to each other.

The slope angle of the first curve A1 with respect to the flat surface S is larger than that of the second curve B1, the deepest point $D_0$ is deviated from the center O of the concave portion 31 in the x-direction. In other words, the average of the absolute value of the slope angle of the first curve A1 with respect to the flat surface is larger than that of the second curve B1. In this embodiment, it is preferable that the averages of the absolute values of the slope angles of the first curves A1 composing a plurality of concave portions 31 are irregularly distributed in the range of 1° to 89°. It is preferable that the averages of the absolute values of the slope angles of the second curves B1 composing a plurality of concave portions 31 are irregularly distributed in the range of 0.5° to 88°.

Since the slope angles of the curves A1, B1 are slowly varied from the periphery of the concave portion 31 to the deepest point $D_0$, the maximum slope angle δa (absolute value) of the first curve A1 is larger than the maximum slope angle δb of the second curve B1, as shown in FIG. 6. The slope angle of the deepest point $D_0$ in which the first curve A1 is connected to the second curve B1 with respect to the flat surface S is zero, and the curves A1, B1 each having a different slope angle are smoothly connected in the deepest point $D_0$.

For example, the maximum slope angles δa of the concave portions 31 are irregularly varied in the range of 2° to 90°. However, the maximum slope angles δa of the most concave portions 31 are irregularly varied in the range of 4° to 35°. Also, the concave portion 31 shown in FIGS. 5 and 6 has a single minimum point $D_0$ (the point having the slope angle of 0 degrees) at the concave surface thereof. The distance between the minimum point $D_0$ and the flat surface S becomes depth d of the concave portion 31 and the depths d of a plurality of concave portions 31 are irregularly varied in the range of 1 µm to 3 µm.

Figure 7:
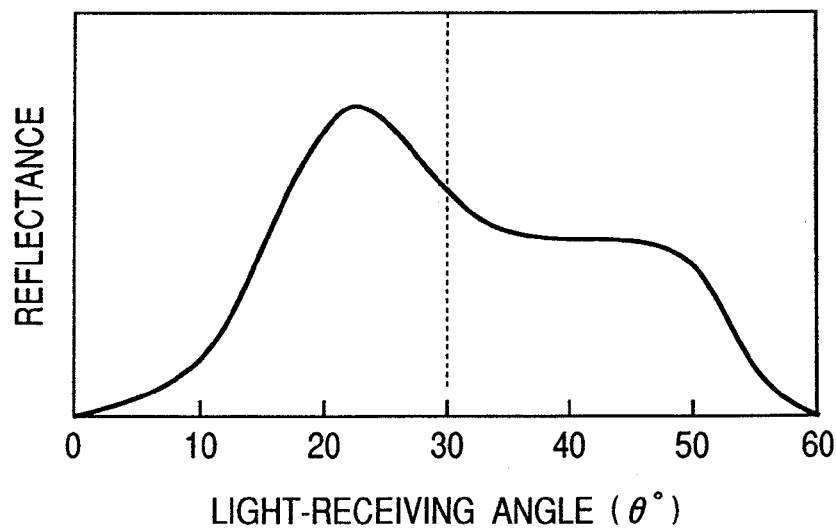
FIG. 7 is a graph showing the reflection characteristics of the transflective film.

It is preferable that the first curves A of a plurality of concave portions 31 formed in the transflective film 12 are arranged in a single direction. By this structure, the direction of the light reflected from the transflective film 12 may be deviated from the specular direction to a specific reflection direction. As a result, as the total reflection characteristics of the specific vertical section, the reflectance of the light reflected by the surface in the vicinity of the second curve B1 increases to converge the reflected light in a specific direction. FIG. 7 shows the relationship of the light-receiving angle (θ°) and the brightness (reflectance) when irradiating the external light to the transflective film in which the first curves A of the concave portions 31 are aligned in a single direction by an incident angle of 30° and when changing the light-receiving angle in the range from the vertical-line location 0° of the transflective film to 60° on the basis of 30° that is the specular reflection direction with respect to the flat surfaces.

As seen from FIG. 7, in the transflective film where the first curves A1 of the concave portions 31 are aligned in the single direction, it has a good reflection characteristic in the wide range of 20° to 50°, and the integral value of the reflectance in the light-receiving angle smaller than 30° that is the specular reflection direction with respect to the flat surface S is larger than the integral value of the reflectance at the light-receiving angle which is larger than the specular reflection angle. That is, the large reflection strength can be obtained in the vicinity of the light-receiving angle of 20°.

In the transflective reflecting liquid crystal display device 1 having this structure, if the external light N is incident to the liquid crystal display panel 9 outdoors in the daytime, the light is reflected at a reflection region other than the aperture 32 of the transflective film 12 formed of the metal thin film, and thus the liquid crystal display panel 9 is brightly illuminated. On the other hand, under the condition that the external light is low, such as at the night time or in the dark room, if the backlight unit 5 is turned on, the illuminated light L irradiated from the backlight unit 5 transmits through the aperture 32 of the transflective film 12 to illuminate the liquid crystal display panel 9. Thereby, the liquid crystal display device 1 can illuminate the liquid crystal display panel 9 with the high brightness by the transflective film 12 although any one of the external light and the backlight unit 5 can be used as the light source.

In the first embodiment of the present invention, a plurality of apertures 32 formed in the dot region 12a are arranged in the longitudinal direction (the vertical direction in FIG. 8) of the dot region 12a and the interval $P_{H1}$ between the adjacent apertures 32, 32 is smaller than or equal to the resolution, preferably 40 μm or less, more preferably 10 μm to 40 μm, and most preferably 10 μm to 25 μm.

If the interval $P_{H1}$ between the adjacent apertures 32, 32 has a visible size, the non-aperture is viewed as a band-shaped dark portion extending in the horizontal direction upon transmission display. Generally, it may be considered that the interval is determined by the resolving angle between two points as is the characteristic of the eye, but, this inventor confirmed that, in the display having a high contrast ratio, it can be viewed even in the angle smaller than the resolving angle.

It is confirmed that, if the interval $P_{H1}$ is larger than 40 μm, the non-aperture is viewed as the band-shaped dark portion extended in the horizontal direction upon the transmission display, and, if the interval $P_{H1}$ is smaller than 25 μm, at least 90% of the viewers can pleasantly see the display. Also, the minimum interval is restricted by the manufacturing limitation, but, according to the viewing test result, 100% of the viewers can see the display without any inconvenience if the interval $P_{H1}$ is larger than 10 μm.

In addition, the interval $P_{H2}$ between the adjacent apertures 32, 32 of two dot regions 12a, 12a among a plurality of dot regions 12a arranged in the longitudinal direction (the vertical direction in FIG. 8) is smaller than or equal to the resolution, preferably 40 μm or less, more preferably 10 μm to 40 μm, and most preferably 10 μm to 25 μm. Here, the reason of setting the interval $P_{H2}$ between the adjacent apertures 32, 32 to the above-mentioned range is similar to the reasoning of setting the interval $P_{H1}$ to the above-mentioned range. If the interval $P_{H2}$ has a visible size, such as in the case that a plurality of dots are turned on in the vertical direction (longitudinal direction) and the horizontal direction (width direction) in the transmission mode when the display mode is in a normally black mode, a band-shaped dark portion extending in the horizontal direction is generated during the display. In case that the lower side of a plurality of dots is turned on when turning on the plurality of dots (the upper side of the plurality of dots) in the horizontal direction in the reflection mode, display of the upper side is accurately deviated to the lower side by a half dot.

Since the lower limit value of the width $W_{BM1}$ of the black matrix 35 is about 10 μm due to the restriction during the manufacturing, the lower limit value of the interval $P_{H2}$ becomes about 10 μm.

Also, if the interval $P_{H1}$ between the adjacent apertures 32, 32 formed in the longitudinal direction of the dot regions 12a and the interval $P_{H2}$ between the adjacent apertures 32, 32 of two dot regions 12a, 12a in the plurality of dot regions arranged in the longitudinal direction are approximately equal to each other, the band-shaped portion generated in the transmission mode or the reflection mode is uniform in the overall screen. Thereby, the display can be uniformly performed. It is preferable that the aperture ratio of the dot region 12a (the total area $S_1$ of a plurality of apertures 32/the area $S_0$ of the dot region 12a) is in the range of 20 to 50%. If the aperture ratio is less than 20%, the sufficient transmission brightness can not be obtained when the transflective mode is used as the transmission mode, the interval between the adjacent apertures in the horizontal direction increases and thus the band-shaped portion in the vertical direction may be easily viewed. The visibility of the band-shaped portion in the vertical direction can be improved by dividing the apertures into several numbers, but it is preferable that the minimum dimension is at least 15 μm because the dimension determining precision of the aperture deteriorates the precision of the aperture ratio. In order to realize the above-mentioned state, it is preferable that the apertures are divided into 3 parts in the vertical direction and are divided into 2 parts in the horizontal direction. In order to realize such an aperture, it is preferable that the aperture ratio is at least 20%. If the aperture ratio is larger than 50%, the sufficient reflection brightness can not be obtained in the case of using the transflective mode as the transmission mode and the width of the aperture increases, thereby the band-shaped portion in the vertical direction is easily viewed in the case of the reflection mode.

The concrete examples of the dimensions of the dot region 12a, the aperture 32, and the black matrix 35 are illustrated.

Figure 9:
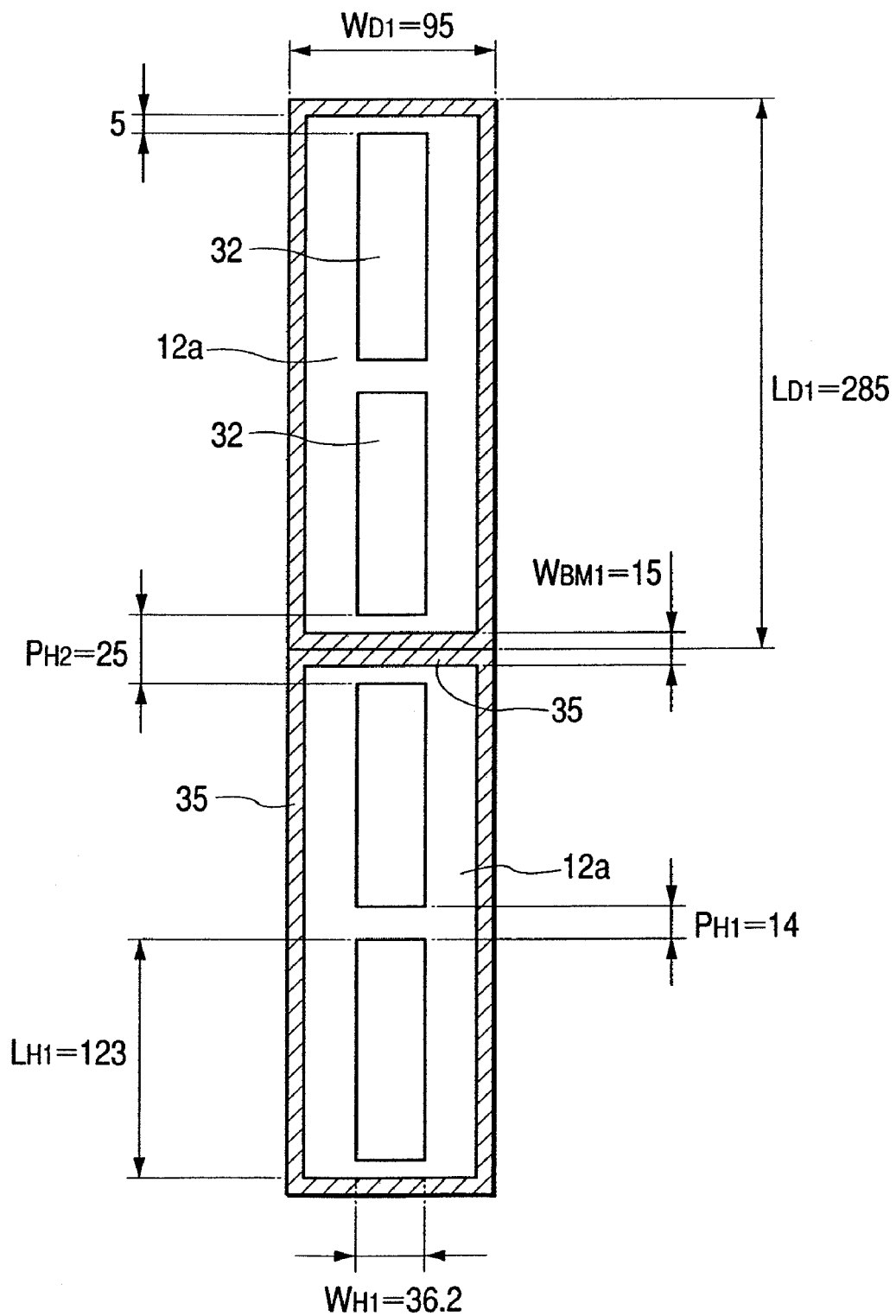
FIG. 9 is a plan view showing a concrete example of the dimensions of the dot region, the aperture, and the black matrix of the liquid crystal display panel equipped in the transflective liquid crystal display device shown in FIG. 1.

In the dimension of two dot regions 12a, as shown in FIG. 9, the length $L_{D1}$ is 285 μm and the width $W_{D1}$ is 95 μm. At this time, in the dimension of each aperture 32, the length $L_{H1}$ is 123 μm and the width $W_{H1}$ is 36.2 μm. Also, the interval $P_{H1}$ between two apertures 32, 32 arranged in the longitudinal direction in one dot region 12a (the interval $P_{H1}$ between adjacent apertures 32, 32) is 14 μm, and the interval $P_{H2}$ between two apertures 32, 32 in two adjacent dot regions 12a, 12a among a plurality of dot regions arranged in the longitudinal direction is 25 μm. The width $W_{BM1}$ of the black matrix 35 is 15 μm taking into consideration that the lamination leads to the alignment of about 5 μm. The aperture ratio of the dot region 12a (the total area $S_1$ of the apertures 32, 32/the area $S_0$ of the dot region 12a) is 33%.

In the transflective liquid crystal display device 1 according to the first embodiment of the present invention, the transflective film 12 in which the interval $P_{H2}$ between the adjacent apertures 32, 32 of two dot regions 12a, 12a arranged in the longitudinal direction (vertical direction) is less than or equal to the resolution. Accordingly, although the plurality of dots 36 are turned on in the vertical direction (longitudinal direction) and the horizontal direction (width direction) in the transmission mode when the display mode is in a normally black mode, the interval between the adjacent apertures in the longitudinal direction can not be viewed, thereby a band-shaped dark portion extending in the horizontal direction is not generated during the display. Also, although the lower side of a plurality of dots are turned on when turning on the plurality of dots (the upper side of the plurality of dots) in the horizontal direction in the reflection mode when the display mode is in the normally black mode, the half-dot deviation is not generated. This is because the aperture interval between the upper and lower pixels is narrower than the clearly viewed interval even when two vertical rows are displayed (as the aperture interval is less than the visible distance). Also, even in case that the display mode is in the normally white mode, the band-shaped dark portion is not generated during the display and the half-dot deviation of the display can be prevented.

Accordingly, since the transflective liquid crystal display device 1 of the present embodiment comprises the transflective film 12 having the above-mentioned structure, the band-shaped dark portion is not generated during the display and the half-dot deviation of the display can be prevented. Therefore, the transflective liquid crystal display device having an excellent display quality can be realized.

Also, although the organic film 11 and the transflective film 12 are formed on the inner side (the side facing the liquid crystal layer) of the first substrate 10 of the liquid crystal display panel 9 in the above-mentioned embodiment, the organic film 11 and the transflective film 12 may be formed on the outer side of the first substrate 10 of the liquid crystal display panel 9.

Figure 10:
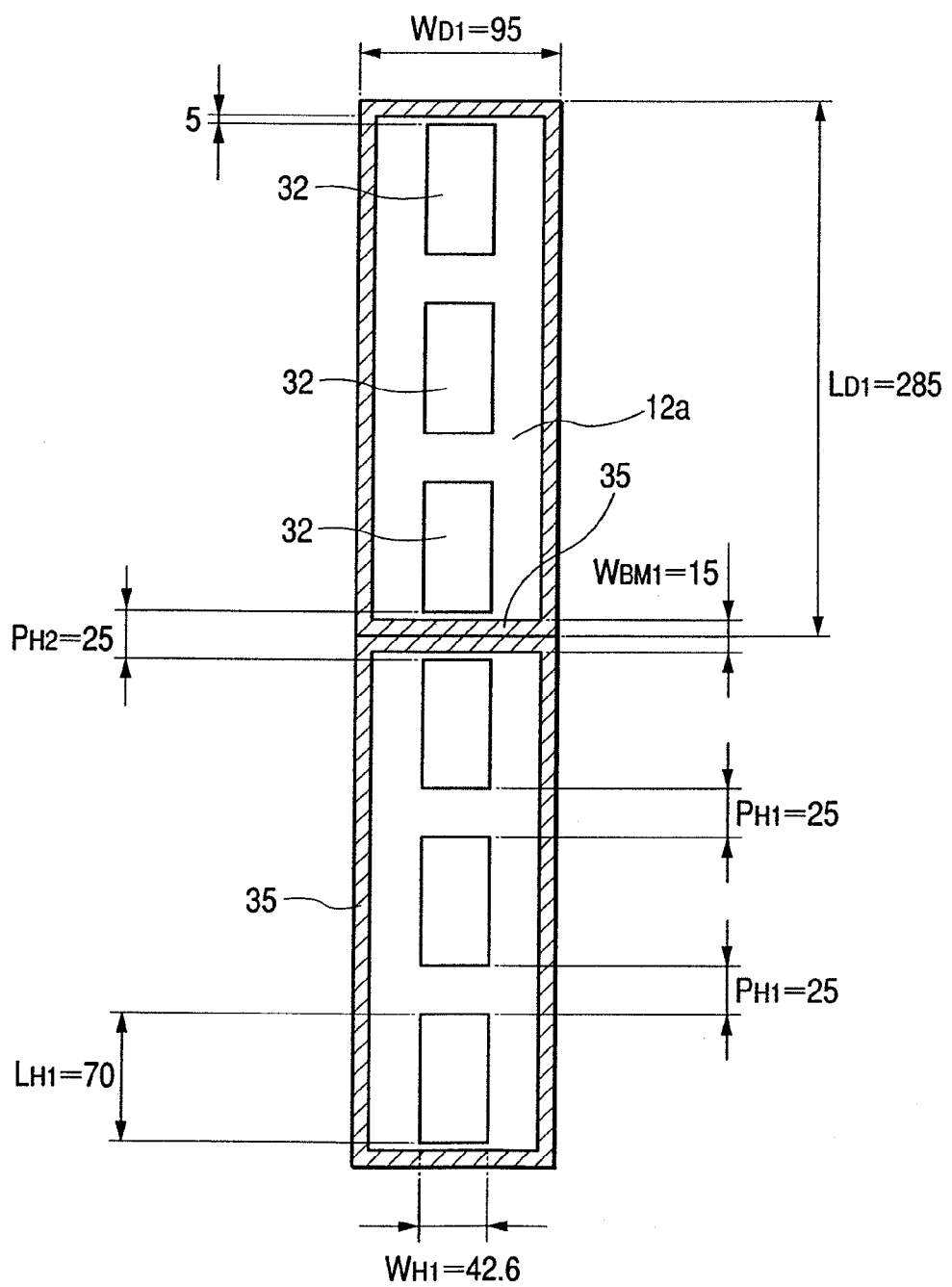
FIG. 10 is a plan view showing a concrete example of the dimensions of the dot region, the aperture, and the black matrix in case of forming three apertures in each dot region of the transflective film.

Further, although two apertures 32 are formed in each dot region 12a of the transflective film 12 in the above-mentioned embodiment, three apertures 32 may be formed in each dot region 12a of the transflective film 12, as shown in FIG. 10. As the concrete example of the dimensions of the dot region 12a, the aperture 32, and the black matrix 35, the length $L_{D1}$ of one dot region 12a is 285 μm, and the width $W_{D1}$ thereof is 95 μm. The length $L_{H1}$ of the aperture 32 is 70 μm, and the width $W_{H1}$ thereof is 42.6 μm. Also, the interval $P_{H1}$ between adjacent apertures 32, 32 of three apertures 32, 32 arranged in the longitudinal direction in one dot region 12a is 25 μm and the interval $P_{H2}$ of adjacent apertures 32, 32 of two adjacent dot regions 12a, 12a in a plurality of dot regions arranged in the longitudinal direction is 25 μm. The width $W_{BM1}$ of the black matrix 35 is 15 μm taking into consideration that the lamination leads to the alignment of about 5 μm. The aperture ratio of the dot region 12a (the total area $S_1$ of the three apertures/the area $S_0$ of the dot region 12a) is 33%.

Figure 18:
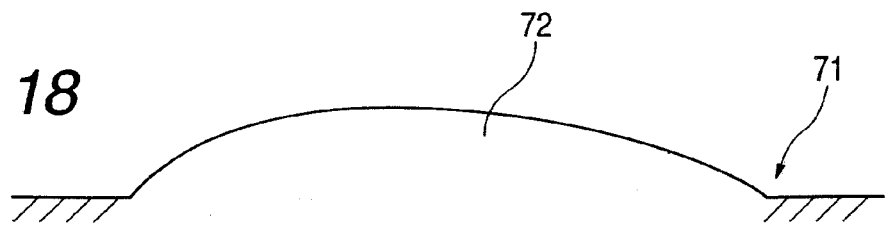
FIG. 18 is an enlarged cross sectional view schematically showing a convex portion formed in the transflective film.
Figure 19:
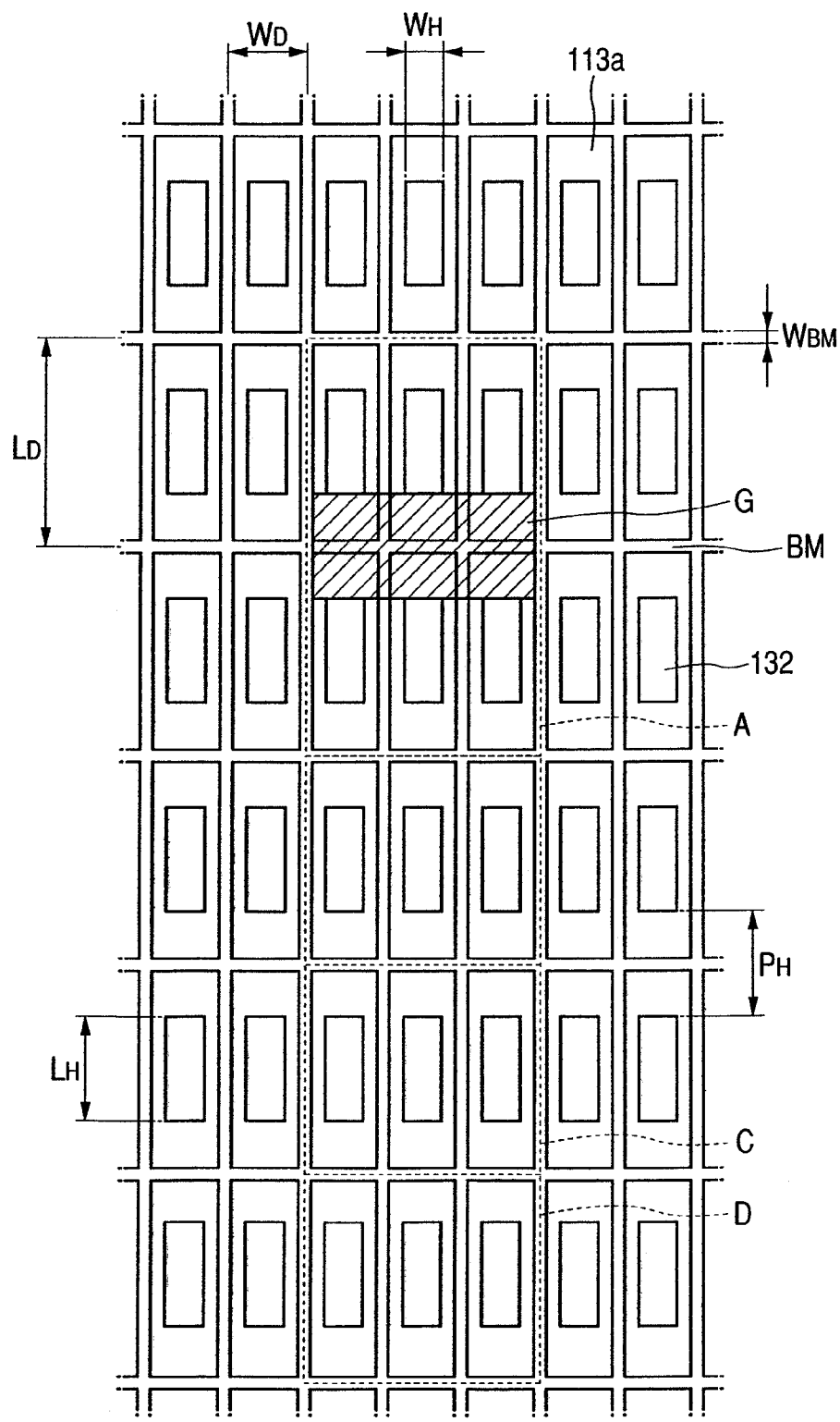
FIG. 19 is a plan view showing the arrangement of the aperture formed in the dot region corresponding to each dot of the liquid crystal display panel equipped in a conventional transflective reflecting liquid crystal display device.
Figure 20:
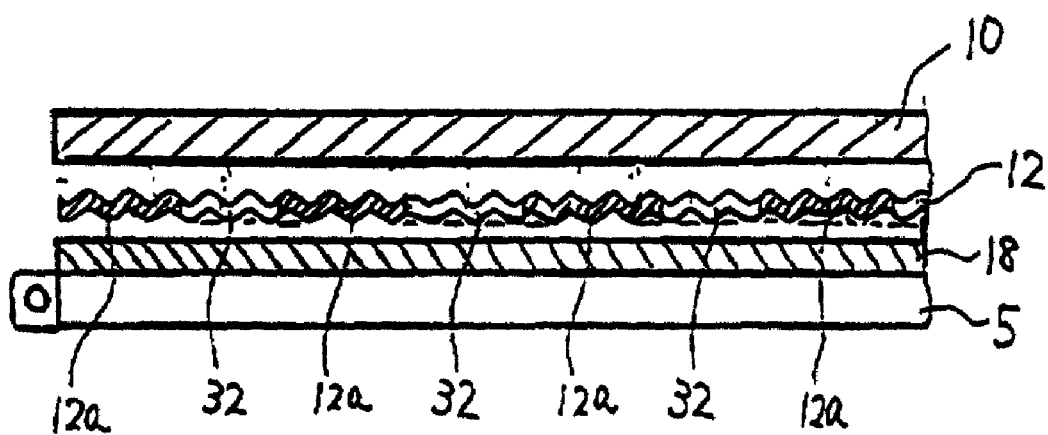
FIG. 20 is an enlarged cross-sectional view showing an example of a transflective liquid crystal display device having a transflective film according to an embodiment of the present invention.

Also, although a plurality of concave portions 31 are formed in the transflective film 12 in the above-mentioned embodiment, a plurality of minute convex portions 72 may be formed on the surface of the transflective film 71, as shown in FIG. 18.

Further, although the transflective film is formed in the passive matrix type liquid crystal display device in the above-mentioned embodiment, the transflective film related to the present invention may be formed in the active matrix type liquid crystal display device using the switching element such as a TFT element or a TFD. In this case, the same effect as the present invention can be obtained.

In the second embodiment of the present invention, two apertures 32, 32 formed in the dot region 12a are arranged in the longitudinal direction (the vertical direction in FIG. 11) of the dot region 12a, and the interval $P_{H1}$ between the adjacent apertures 32, 32 is smaller than or equal to the resolution. Preferably the interval $P_{H1}$ is 40 μm or less, more preferably 10 μm to 40 μm, and most preferably 10 μm to 25 μm.

If the interval $P_{H1}$ between the adjacent apertures 32, 32 has a visible size, the non-aperture is viewed as a band-shaped dark portion extending in the horizontal direction during transmission display. Generally, it may be considered that this interval is determined by the resolving angle between two points that is the characteristic of the eye. However, this inventor confirmed that, in the display having a high contrast ratio, it can be viewed even in an angle smaller than the resolving angle.

It is confirmed that, if the interval $P_{H1}$ is larger than 40 μm, the non-aperture is viewed as a band-shaped dark portion extending in the horizontal direction during transmission display and the display quality deteriorates, and, if the interval $P_{H1}$ is smaller than 25 μm, at least 90% of the viewers can pleasantly see the display. Also, the minimum interval is restricted by the manufacturing limitation, but according to the viewing test result, if the interval $P_{H1}$ is larger than 10 μm, 100% of the viewers do not feel any inconvenience.

Furthermore, as shown in FIG. 11, the apertures 32, 32 at the adjacent longitudinal ends in two adjacent dot regions 12a, 12a among a plurality of dot regions 12a arranged in the longitudinal direction communicate with each other through a connection aperture 32e, thereby composing a long aperture 32g. That is, the upper aperture 32b of one dot region 12a of (lower side) of two dot regions 12a, 12a arranged in the vertical direction of the paper of the FIG. 11 and the lower aperture 32c of the other dot region 12b (upper side) are connected to each other through the connection aperture 32e to compose one long aperture 32g. The connection aperture 32e is formed in the lower region (black region) of the black matrix 35 formed between the adjacent dots among a plurality of dots arranged in the longitudinal direction. That is, the long aperture 32g is formed so as to commutate with the black region.

The transflective film 12 of the present embodiment is characterized in that two apertures 32 are formed in the dot region 12a, the interval between the adjacent apertures 32, 32 is smaller than the resolution, and the apertures 32, 32 arranged at the both ends of the longitudinal direction (vertical direction) of the dot region between two apertures 32, 32 formed in the dot region 12a communicate with the portion in which the black region is formed.

In case that the apertures 32, 32 at the adjacent longitudinal ends of two dot regions 12a, 12a arranged in the vertical direction do not communicate with each other, if the interval between the apertures 32, 32 is too wide (for example, the interval has a visible size), the interval between adjacent apertures in the longitudinal direction can be viewed when turning on a plurality of dots in the vertical direction (longitudinal direction) and the horizontal direction (width direction) in the transmission mode when the display mode is in the normally black mode, and thus the band-shaped dark portion extending in the horizontal direction is generated during the display.

It is preferable that the aperture ratio of the dot region 12a (the total area $S_1$ of two apertures 32/the area $S_0$ of the dot region 12a) is in the range of 20 to 50%. If the aperture ratio is less than 20%, the sufficient transmission brightness can not be obtained when the transflective mode is used as the transmission mode, the interval in the horizontal direction of the adjacent apertures increases and thus the band-shaped portion in the vertical direction may be easily viewed. The visibility of the band-shaped portion in the vertical direction can be improved by dividing the apertures into several numbers. It is preferable that the minimum dimension is at least 15 μm because the dimension determining precision of the aperture deteriorates the precision of the aperture ratio. In order to realize the above-mentioned state, it is preferable that the apertures are divided into 3 parts in the vertical direction and are divided into 2 parts in the horizontal direction. In order to realize such an aperture, it is preferable that the aperture ratio is at least 20%. If the aperture ratio is larger than 50%, the sufficient reflection brightness can not be obtained in the case of using the transflective mode and the width of the aperture increases, thereby the aperture is easily viewed as the band-shaped portion in the vertical direction in the case of the reflection mode.

The concrete examples of the dimensions of the dot region 12a, the aperture 32 and the black matrix 35 are illustrated. In the dimension of one dot region 12a, as shown in FIG. 11, the length $L_{D1}$ is 285 μm and the width $W_{D1}$ is 95 μm. At this time, in the dimension of each aperture 32, the length $L_{H1}$ is 128 μm and the width $W_{H1}$ is 35 μm. Also, the interval $P_{H1}$ between two apertures 32, 32 arranged in the longitudinal direction in one dot region 12a (the interval $P_{H1}$ between adjacent apertures 32, 32) is 14 μm, and the length $L_{H2}$ in the longitudinal direction of the long aperture 32g is 271 μm. The width $W_{BM1}$ of the black matrix 35 is 15 μm, but may be narrower than 15 μm or may be 10 μm. The aperture ratio of the dot region 12a (the total area $S_1$ of the apertures 32, 32/the area $S_0$ of the dot region 12a) is 33%.

The transflective liquid crystal display device 1 according to the present embodiment comprises a transflective film 12 in which two apertures 32 are arranged in the longitudinal direction (vertical direction) of the dot region 12a, the interval $P_{H2}$ between the adjacent apertures 32, 32 is less than or equal to the resolution, and the apertures 32, 32 at the adjacent longitudinal end in the adjacent dot regions 12a, 12a of a plurality of dot regions arranged in the longitudinal direction communicate with each other. Accordingly, the interval between the adjacent apertures in/the longitudinal direction can not be viewed although a plurality of dots 36 are turned-on in the vertical direction (longitudinal direction) and the horizontal direction (width direction) in the transmission mode when the display mode is in a normally black mode, thereby a band-shaped dark portion extending in the horizontal direction is not generated during the display. Also, although the lower side of a plurality of dots are turned on when turning on the plurality of dots (the upper side of a plurality of dots) in the horizontal direction in the reflection mode when the display mode is in the normally black mode, the half-dot deviation is not generated. This is because the aperture interval between the upper and lower pixels is narrower than the clearly viewed interval even when two vertical rows are displayed (as the aperture interval is less than the visible distance). Also, even in case that the display mode is in the normally white mode, the band-shaped dark portion is not generated during the display and the half-dot deviation of the display can be prevented.

Accordingly, since the transflective liquid crystal display device 1 of the present embodiment comprises the transflective film 12 having the above-mentioned structure, the band-shaped dark portion is not generated during the display and the half-dot deviation of the display can be prevented. Therefore, the transflective liquid crystal display device having an excellent display quality can be realized.

Also, although the organic film 11 and the transflective film 12 are formed on the inner side (the side facing the liquid crystal layer) of the first substrate 10 of the liquid crystal display panel 9 in the above-mentioned embodiment, the organic film 11 and the transflective film 12 may be formed on the outer side of the first substrate 10 of the liquid crystal display panel 9. Further, although the transflective film 12 in which two apertures 32 are formed in each dot region 12a was illustrated as shown in FIG. 11 in the above-mentioned embodiment, the transflective film shown in FIGS. 13 to 17 can be used.

Figure 13:
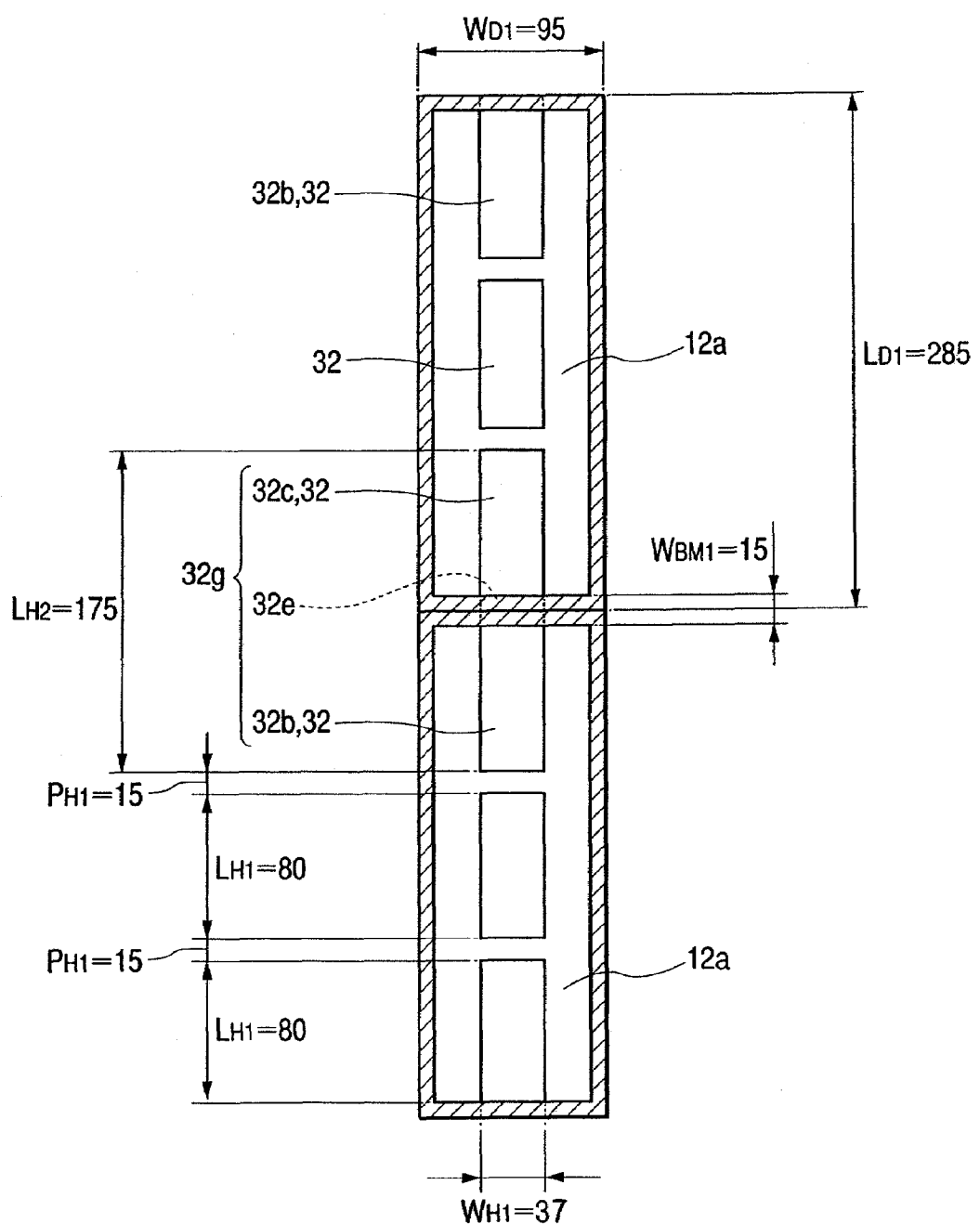
FIG. 13 is a plan view showing a concrete example of the dimensions of the dot region, the aperture and the black matrix in case of forming three apertures in each dot region of the transflective film.

The transflective film 12 in FIG. 13 is formed with three apertures 32 at each dot region 12a. In this case, the aperture 32 between the upper aperture 32b and the lower aperture 32c is an independent aperture. As the concrete example of the dimensions of the dot region 12a, the aperture 32, and the black matrix 35 in the case of forming three apertures 32 in each dot region 32c of the transflective film 12, the length $L_{D1}$ of one dot region 12a is 285 μm, the width $W_{D1}$ thereof is 95 μm. The length $L_{H1}$ of the aperture 32 is 80 μm, and the width $W_{H1}$ is 37 μm. Also, the interval $P_{H1}$ between adjacent apertures 32, 32 of three adjacent apertures arranged in the longitudinal direction in one dot region 12a is 15 μm, and the length $L_{H2}$ in the longitudinal direction of the long aperture 32g is 175 μm. The width $W_{BM1}$ of the black matrix 35 is 15 μm, but may be narrower than 15 μm or may be 10 μm. The aperture ratio of the dot region 12a (the total area $S_1$ of three apertures/the area $S_0$ of the dot region 12a) is 33%.

Figure 14:
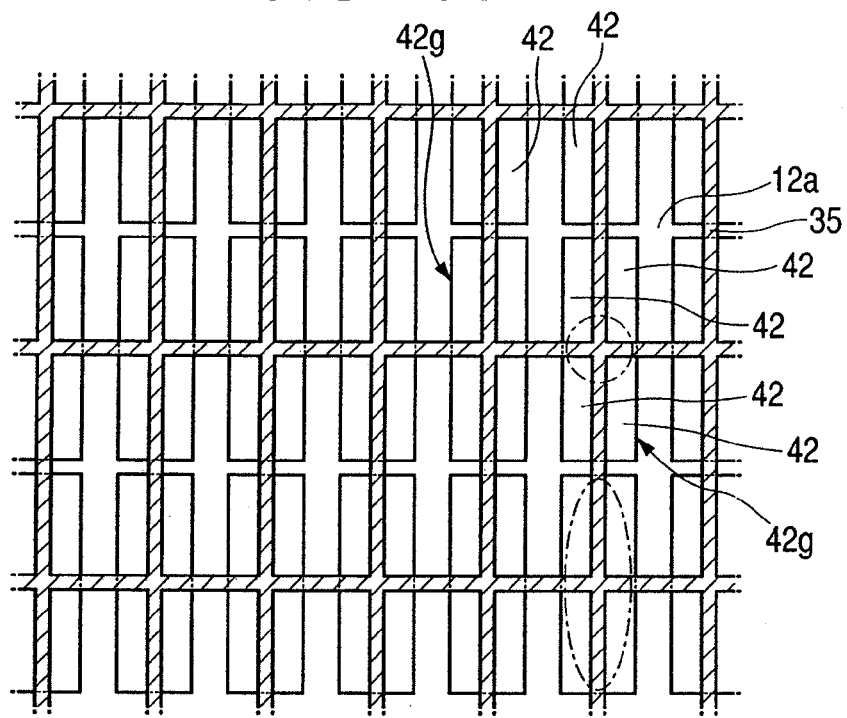
FIG. 14 is a plan view showing another example of the arrangement of a plurality of apertures formed in the dot region of the transflective film according to the present invention.

The transflective film of FIG. 14 is formed with four apertures 42 at each dot region 12a. In this transflective film, the apertures are formed at the corner of each dot region 12a and the interval between the adjacent apertures is smaller than the resolution. The aperture 42 formed at the corner of the dot region 12a communicates with the aperture 42 at the corner of the upper or lower dot region 12a of the dot region 12a, the aperture 42 at the corner of the right or left dot region 12a, and the aperture 42 at the corner of the upper or lower dot region 12a in the oblique line thereof. That is, four apertures 42 at the location corresponding to the intersection of the black matrix 35 and the periphery thereof communicate with each other, thereby composing the long aperture 42g. The long aperture 42g is formed so as to communicate with the black region corresponding to the black matrix 35.

In the transflective film in FIG. 14, the apertures arranged at the both end of the longitudinal direction (vertical direction) of the dot region and the both end of the width direction (horizontal direction) communicates with the portion in which the black region is formed.

Figure 15:
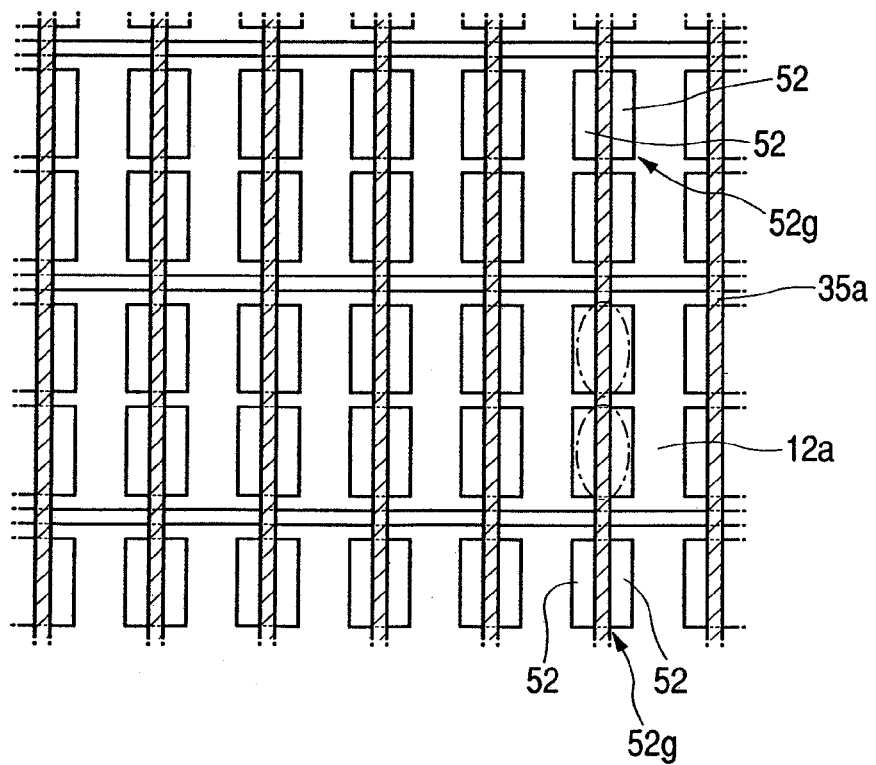
FIG. 15 is a plan view showing another example of the arrangement of a plurality of apertures formed in the dot region of the transflective film according to the present invention.

The transflective film in FIG. 15 is formed with four apertures 52 at each dot region 12a. In the transflective film, two apertures 52 are formed at the both ends of the horizontal direction of each dot region 12a along the vertical direction, the interval between the adjacent apertures is smaller than the resolution, and the aperture 52 formed in the dot region 12a communicates with the aperture 52 at the left or the right end of the dot region 12a arranged at the right or left side of the dot region 12a. That is, two apertures 52 between the adjacent dot regions 12a, 12a in the horizontal direction communicate with each other, thereby composing the long aperture 52g at the location corresponding to the intersection of the black matrix 35 and the periphery thereof. The long aperture 52g is formed so as to communicate with the portion in which the black region corresponding to the black matrix 35a is formed.

In the transflective film in FIG. 15, the aperture arranged at the both end of the longitudinal direction (vertical direction) of the dot region and/or the both end of the width direction (horizontal direction) communicates with the portion in which the black region is formed.

The color filter of the transflective liquid crystal display device comprising the transflective film in FIG. 15 may be formed with a vertical black matrix 35a.

Figure 16:
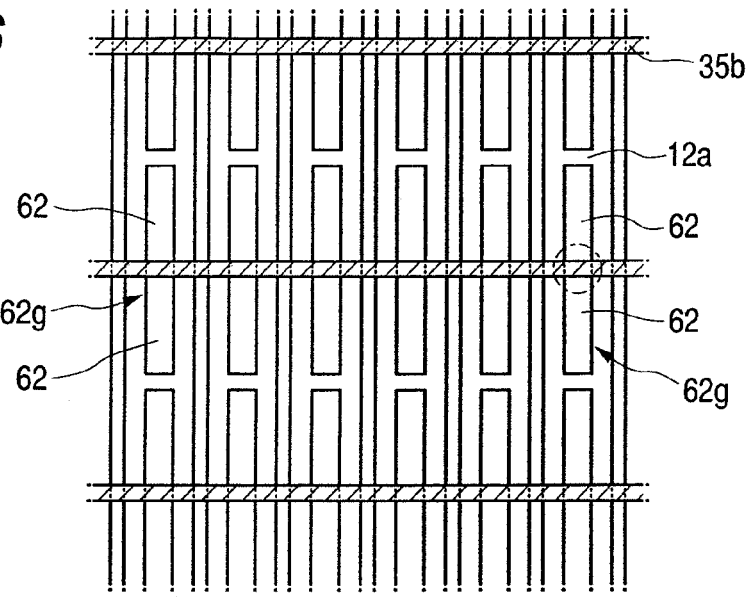
FIG. 16 is a plan view showing another example of the arrangement of a plurality of apertures formed in the dot region of the transflective film according to the present invention.

The transflective film in FIG. 16 is formed with two apertures 62 at each dot region 12a. In the transflective film, two apertures 62, 62 are formed at the both ends of the vertical direction of each dot region 12a, the interval between the adjacent apertures is smaller than the resolution, and the aperture 62 formed in the dot region 12a communicates with the aperture 62 of the upper or lower end of the dot region 12a arranged at the upper or lower side of the dot region 12a. That is, two apertures 62 between the adjacent dot regions 12a, 12a in vertical direction communicate with each other, thereby composing the long aperture 62g at the location corresponding to the horizontal black matrix 35b. The long aperture 62g is formed to communicate with the black region corresponding to the black matrix 35a.

In the transflective film in FIG. 16, the apertures arranged at the both end of the longitudinal direction (vertical direction) of the dot region and/or the both end of the width direction (horizontal direction) communicates with the portion in which the black region corresponding to the horizontal black matrix 35b is formed.

The color filter of the transflective liquid crystal display device comprising the transflective film in FIG. 16 may be formed with a horizontal black matrix 35b.

Figure 17:
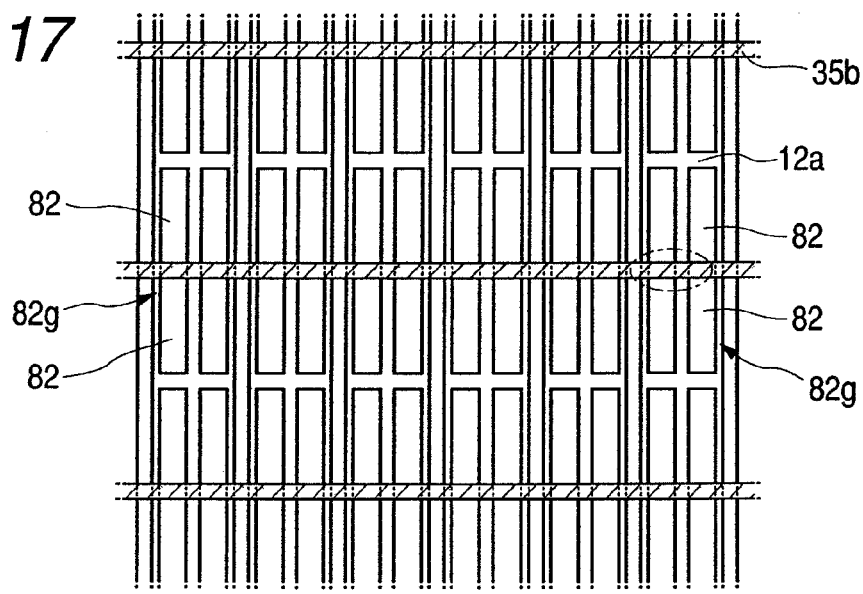
FIG. 17 is a plan view showing another example of the arrangement of a plurality of apertures formed in the dot region of the transflective film according to the present invention.

The transflective film in FIG. 17 is formed with four apertures 82 at each dot region 12a. In the transflective film, two apertures 82, 82 are formed at the both ends of the horizontal direction of each dot region 12a along the vertical direction, the interval between the adjacent apertures is smaller than the resolution, and the aperture 82 formed in the dot region 12a communicates with the aperture 82 of the upper or lower end of the dot region 12a arranged at the upper or lower side of the dot region 12a. That is, two apertures 82 between the adjacent dot regions 12a, 12a in the horizontal direction communicate with each other, thereby composing the long aperture 82g at the location corresponding to the horizontal black matrix 35b and the periphery thereof. The long aperture 82g is formed so as to communicate with the black region corresponding to the black matrix 35b.

In the transflective film in FIG. 17, the aperture arranged at the both end of the longitudinal direction (vertical direction) of the dot region and/or the both end of the width direction (horizontal direction) communicates with the portion in which the black region is formed.

The color filter of the transflective liquid crystal display device comprising the transflective film in FIG. 17 may be formed with a horizontal black matrix 35b.

Also, although a plurality of concave portions 31 are formed in the transflective film 12 in the above-mentioned embodiment, a plurality of minute convex portions 72 may be formed on the transflective film 71, as shown in FIG. 18. Further, although the passive matrix type liquid crystal display device having the transflective film is illustrated in the above-mentioned embodiment, the transflective film may be provided in the active matrix type liquid crystal display using a thin film transistor or a thin film diode. In this case, the same effect as the present invention can be obtained.

What is claimed is:

1. A transflective film provided on an inner or outer side of a liquid crystal display panel having opposing electrodes provided between a pair of substrates with a liquid crystal layer interposed therebetween and a plurality of pixels defined by the opposing electrodes, wherein the transflective film comprises a plurality of minute concave portions or minute convex portions formed on a surface thereof, and a plurality of apertures, which transmits light from an illumination device that illuminates the liquid crystal display panel from a back surface thereof, formed in a dot region corresponding to each dot included in each of the pixels, and wherein an inter-aperture interval is set to be equal to or smaller than a vision resolution so that a boundary region between the adjacent apertures in two adjacent dot regions of a plurality of dot regions is not visible.

2. The transflective film according to claim 1, wherein the inter-aperture interval is set to be equal to or smaller than the vision resolution so that the boundary region between the adjacent apertures in two adjacent dot regions of the plurality of dot regions arranged in a longitudinal direction is not visible.

3. The transflective film according to claim 2, wherein the interval between the adjacent apertures in two adjacent dot regions of the plurality of dot regions arranged in the longitudinal direction is 40 µm or less.

4. The transflective film according to claim 1, wherein each pixel of the liquid crystal display panel comprises three dots colored Red, Green and Blue.

5. A transflective liquid crystal display device, comprising a liquid crystal display panel which has opposing electrodes provided between a pair of substrates with a liquid crystal layer interposed therebetween and a plurality of pixels defined by the opposing electrodes, and an illumination device for illuminating the liquid crystal display panel from a back surface side thereof, wherein the transflective film according to claim 1 is formed on an inner or outer side of the liquid crystal display panel.

6. The transflective liquid crystal display device according to claim 5, wherein a driving method thereof is of an active matrix type.

7. The transflective film according to claim 1, further comprising apertures for communicating with a portion in which a black region is formed.

8. The transflective film according to claim 7, wherein the interval between the adjacent apertures is less than or equal to 40 µm.

9. The transflective film according to claim 7, wherein each pixel of the liquid crystal display panel comprises thee dots colored Red, Green and Blue.

10. A transflective liquid crystal display device comprising a liquid crystal display panel which has opposing electrodes provided between a pair of substrates with a liquid crystal layer interposed therebetween and a plurality of pixels defined by the opposing electrodes, and an illumination device for illuminating the liquid crystal display panel from a back surface side thereof, wherein the transflective film according to claim 7 is formed on an inner or outer side of the liquid crystal display panel.

11. The transflective liquid crystal display device according to claim 10, wherein each pixel of the liquid crystal display panel comprises three dots colored Red, Green and Blue, a black matrix is formed in a periphery of each dot, and a width of the black matrix is in the range of 10 µm to 25 µm.

12. A transflective film provided on an inner or outer side of a liquid crystal display panel having opposing electrodes provided between a pair of substrates with a liquid crystal layer interposed therebetween and a plurality of pixels defined by the opposing electrodes, wherein the transflective film comprises a plurality of minute concave portions or minute convex portions formed on a surface thereof, and a plurality of apertures, which transmits light from an illumination device that illuminates the liquid crystal display panel from a back surface thereof, formed in a dot region corresponding to each dot included in each of the pixels, and wherein plural of apertures are arranged in each dot region and an inter-aperture interval is set to be equal to or smaller than a vision resolution so that a boundary region between the adjacent apertures arranged in the dot region is not visible.

13. The transflective film according to claim 12, wherein the interval between the adjacent apertures of the plural apertures arranged in the dot region is 40 µm or less.

14. The transflective film according to claim 12, wherein the interval between the adjacent apertures of the plural apertures arranged in the dot region is substantially equal to the interval between adjacent apertures in two adjacent dot regions of a plurality of dot regions arranged in a longitudinal direction.

15. The transflective film according to claim 12, wherein each pixel of the liquid crystal display panel comprises three dots colored Red, Green and Blue.

16. A transflective liquid crystal display device comprising a liquid crystal display panel which has opposing electrodes provided between a pair of substrates with a liquid crystal layer interposed therebetween and a plurality of pixels defined by the opposing electrodes, and an illumination device for illuminating the liquid crystal display panel from a back surface side thereof, wherein the transflective film according to claim 12 is formed on an inner or outer side of the liquid crystal display panel.

17. The transflective liquid crystal display device according to claim 16, wherein a driving method thereof is of an active matrix type.

* * * * *